2,849,326

PAPER COATING COMPOSITION AND PROCESS OF MAKING IT

John J. Schoenberger, Willow Springs, and Gabriel T. Turula, Park Forest, Ill., assignors to Corn Products Refining Company, New York, N. Y., a corporation of New Jersey No Drawing. Application June 21, 1955
Serial No. 517,046

3 Claims. (Cl. 106—205)

This invention relates to a composition and method of preparation of pigment coating containing high solids content for paper and paperboard by both the so-called machine and off-machine coating processes. In addition, these coatings may be applied at the calender, size tub or size press.

In the application of pigment coatings of which the major portion generally consists of kaolin clay, titanium dioxide, calcium carbonate, barium sulfate, lithopone or satin white or mixtures thereof, an adhesive is required to bind the pigment to itself and to the paper fibers composing the base paper stock so that the coating is adequately adhered on the dried coated sheet. Among the adhesives commonly used are modified starches, e. g., oxidized or enzyme treated, and dextrines.

In making the prior art coating, the modified starch or dextrine is cooked with water to about 190° F. to gelatinize the same. The paste is usually cooled to about 140° F. or lower, but in some instances may be used without any cooling. The pigment is slurried in water and this is added to the cooked paste or vice versa. In the case of enzyme modified starch, this modification is generally done by the user. Raw starch is gelatinized and converted with an enzyme to the desired viscosity and then the pigment slurry is added or vice versa. Or the starch may be modified by the enzyme in the presence of the pigment.

Although the aforementioned procedures produce satisfactory coatings, they are by no means simple nor as economical as desired. For example, additional time, labor, space, and equipment are required for the gelatinizing and cooling steps and the blending. Usually live steam is used to gelatinize the starch, and there is usually some contamination resulting from the steam lines. In addition, the water of condensation results in additional water necessary to be evaporated subsequently from the system. If there is variation in the cooking time of the adhesive, this will result in variations of the viscosity of both the adhesive and the coating and ultimately in variation of the total solids content of the coating.

It is highly desirable that coatings, particularly those intended for machine application, contain a high solids content so that the drying operation can be accomplished in a short time without slowing the machine. Accordingly, there is a need for adhesives which permit the use of high solids content. The aforementioned adhesives under ideal conditions permit total solids content as high as 65 percent, but generally the solids content is below 60 percent, the principal reason being that when the adhesive is cooked, the viscosity of the paste increases rapidly at a certain stage and this alone requires considerable amounts of water, which when added to the minimum amount of water required to hydrate the pigment results in a lower solids content coating.

From the foregoing, it is obvious that there is need for an adhesive which requires no cooking, permits the use of solids content considerably above that now possible, and at the same time, provides the necessary properties for adherence of the pigment to itself and to the paper fibers of the base paper.

It is the main object of this invention to provide such an adhesive and an improved process, incorporating such adhesive, for its use in paper coating, particularly for machine coating. Other objects will appear hereinafter.

We have discovered that polymers derived from starch having the characteristics hereinafter specified not only provide the necessary adhesive strength but also permit the use of 70 percent solids content in paper coatings. These are unexpected results over those obtained with prior art adhesives and methods of preparation of pigment paper coatings. These adhesives have very definite practical advantages over the carbohydrate adhesives commonly used in the prior art. Since they require no cooking before use, required equipment for heating and cooling aqueous dispersions is materially simplified and the time of preparation is drastically reduced. Since these adhesives are already at a viscosity level suitable for use in paper coatings, no elaborate adhesive converting equipment is required whatsoever and expensive supervision to arrive at the proper conversion level for coating work may be dispensed with.

Viscosity of a coating slip is a very important factor in the use of coatings in a paper mill. Viscosity of the prepared coating is presently the primary limiting factor preventing many paper companies from increasing the speed of their paper machines and producing paper at lower costs. While many different methods of measuring viscosity are employed, reference is made here to values with a Brookfield viscosimeter. By this method a viscosity of about 4000 centipoises is about the maximum workable viscosity that can be handled on most paper coating machines. Using chlorinated starches, and in most cases with enzyme converted starches, the above mentioned viscosity is reached at about 60 to 62 percent total solids in the clay coating. In the work which we have done employing products of our invention and specifically using the first product referred to in the table in the example which follows, we can prepare a clay coating at 69 to 70 percent solids with a viscosity of 1500 centipoises.

The savings in money and time which result in coating paper with colors having 70 percent solids content compared to those in 50 percent solids range may be more readily appreciated when it is recalled that in the former there are only 30/70 or 0.43 pound of water to be evaporated from the coated paper sheet per pound of coating applied, whereas at the 50 percent solids level there is 50/50 or 1.00 pound of water to be evaporated for every pound of coating applied. Thus, in the conventional processes not only are the costs for water evaporation double those of the present invention but even more important, the output of coated paper from a given machine is very materially increased when using the higher density coating.

The starch products suitable for our invention should have a dextrose equivalent (D. E.) value within the range of about 5 to about 50 and should be soluble in cold water to the extent of at least about 90 percent. (The term "dextrose equivalent," as used herein, means the percent of reducing sugar, calculated as dextrose, on dry basis.) The preferred product is a partially hydrolyzed starch having a D. E. value of about 5 to about 10 which has been dried over heated rolls or spray dried. Starch sirups may also be used as well as starch sirup solids which have been dried and polymerized in the presence of a catalyst as described and claimed in U. S. Patent 2,563,014 issued August 7, 1951.

The amount of polymer may be as low as 15 percent based on the pigment solids of a coating, and 15 to 25 percent is a practical operating range, which permits the use of a large amount of pigment in the coating. The amount of pigment in the coating may vary from 50 to 60 parts.

The method of carrying out the preparation of the paper coating with the present invention is relatively very simple compared to methods used in the prior art. The adhesive and pigment are stirred in water and a small amount of an alkali, such as sodium hydroxide, is added to aid in dispersing the adhesive. In the event that predispersed pigments are not available, a small amount of a pigment dispersing agent (0.1 to 1 percent of the pigment), e. g., tetrasodium pyrophosphate, sodium hexametaphosphate, may be used to disperse the pigment in accordance with conventional practice.

A typical formulation is as follows:

78 parts cold water
150 parts predispersed clay (sold under the trademark Hydrasperse)
30 parts adhesive (carbohydrate polymer) dry basis
Sufficient 10 percent sodium hydroxide solution to give final coating a pH of 8.0–9.5.

The clay and adhesive are added to the cold water under agitation in a suitable tank such, as for example, a simple, open wooden tub with a paddle type stirrer, and then the sodium hydroxide solution is added and stirring continued until the mixture is sufficiently homogeneous and free flowing for application.

A variety of carbohydrate polymers was tested in accordance with the above formulation. In the table below are listed the products tested and their D. E. values and solubilities in cold water. Paper sheets were coated with these formulations and the strength of these coatings was measured by the Dennison Wax Pick test. (This test is described at page 503 of Chemistry and Industry of Starch, 2nd Edition, Kerr.)

| Adhesive constituent | Solubility in cold water, percent | D. E. value | Dennison wax pick value |
|---|---|---|---|
| Low D. E. starch hydrolyzate roll dried | 95+ | 6 | 8 |
| Low D. E. starch hydrolyzate partially repolymerized | 93+ | 10 | 5 |
| Corn sirup solids | 100 | 18 | 4-5 |
| Corn sirup | 100 | 30 | 4-5 |
| Do | 100 | 42 | 4 |

For many printing applications a Dennison Wax test of 4 and higher is considered satisfactory. Values below 4 are indicative of an unsatisfactory weak coating.

It will be observed that in all the examples given above using polymers derived from starch which were substantially soluble in water without cooking, paper coatings were produced which passed strength satisfactory for printing as measured by the Dennison Wax test.

We claim:

1. A ready-to-use, paper coating composition having a pH of about 8.0 to 9.5 and consisting of 25 to 30 parts of water, 7.5 to 15 parts of a polymer derived from starch, and 60 to 50 parts of pigment containing a small amount of a pigment dispersing agent; said polymer being from the group consisting of dried partially hydrolyzed starch and repolymerized dried partially hydrolyzed starch and having a D. E. value within the range of about 5 to about 50 and being soluble in cold water to the extent of at least 90 percent.

2. A composition in substantially dry form, adapted for application to paper in the form of an aqueous slurry having a pH of about 8.0 to 9.5, and consisting of 7.5 to 15 parts of a polymer derived from starch and 60 to 50 parts of pigment; said polymer being from the group consisting of dried partially hydrolyzed starch and repolymerized dried partially hydrolyzed starch having a D. E. value within the range of about 5 to about 50 and being soluble in water to the extent of at least 90 percent.

3. The method of preparing a coating composition which comprises forming a dispersion in cold water of a pigment, a pigment dispersing agent, an alkali, and an adhesive, the pH of the dispersion ranging from 8 to 9.5; said adhesive being selected from the group consisting of dried partially hydrolyzed starch and repolymerized dried partially hydrolyzed starch having a D. E. value within the range of about 5 to about 50 and being soluble in cold water to the extent of at least 90 percent.

References Cited in the file of this patent

UNITED STATES PATENTS

| | | |
|---|---|---|
| 2,171,796 | Kelling | Sept. 5, 1939 |
| 2,220,987 | Bauer | Nov. 12, 1940 |
| 2,360,828 | Craig | Oct. 24, 1944 |
| 2,388,526 | Craig | Nov. 6, 1945 |
| 2,394,233 | Craig | Feb. 5, 1946 |
| 2,466,172 | Kesler et al. | Aug. 5, 1949 |
| 2,526,598 | Barrett | Oct. 17, 1950 |
| 2,563,014 | Durand | Aug. 7, 1951 |
| 2,700,621 | Schwalbe | Jan. 25, 1955 |